United States Patent
Rahnama-Moghaddam et al.

(10) Patent No.: US 11,227,192 B1
(45) Date of Patent: Jan. 18, 2022

(54) SYSTEM AND METHOD FOR DATA DRIFT DETECTION

(71) Applicant: Booz Allen Hamilton Inc., McLean, VA (US)

(72) Inventors: Arash Rahnama-Moghaddam, Fairfax, VA (US); Vincent Joseph Glorioso, Fairfax, VA (US); Clayton Davis, Collierville, TN (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 17/339,169

(22) Filed: Jun. 4, 2021

(51) Int. Cl.
*G06K 9/62* (2006.01)
*G06N 3/08* (2006.01)

(52) U.S. Cl.
CPC .......... *G06K 9/6265* (2013.01); *G06K 9/628* (2013.01); *G06K 9/6232* (2013.01); *G06K 9/6256* (2013.01); *G06N 3/08* (2013.01)

(58) Field of Classification Search
CPC .... G06K 9/6265; G06K 9/6256; G06K 9/628; G06K 9/6232; G06N 3/08
See application file for complete search history.

(56) References Cited

U.S. PATENT DOCUMENTS

| | | | |
|---|---|---|---|
| 10,061,300 B1* | 8/2018 | Coffman | G06N 3/126 |
| 2008/0301070 A1* | 12/2008 | Bartlett | G06K 9/623 |
| | | | 706/12 |
| 2015/0339572 A1* | 11/2015 | Achin | G06Q 10/06 |
| | | | 706/46 |
| 2018/0060738 A1* | 3/2018 | Achin | G06Q 10/04 |
| 2018/0060744 A1* | 3/2018 | Achin | G06N 5/02 |
| 2020/0082270 A1* | 3/2020 | Gu | G06F 21/602 |
| 2020/0202179 A1* | 6/2020 | Rajarathinam | G06N 3/0454 |
| 2020/0286002 A1* | 9/2020 | Szanto | G06F 40/30 |
| 2020/0364953 A1* | 11/2020 | Simoudis | B60W 60/001 |
| 2020/0410403 A1* | 12/2020 | Kamulete | G06N 7/005 |

* cited by examiner

Primary Examiner — Samir A Ahmed

(74) Attorney, Agent, or Firm — Buchanan Ingersoll & Rooney PC

(57) ABSTRACT

Exemplary systems and methods to extract, transform, and save to memory features from a training and a test dataset at extraction layers in a machine-learning model. For each data element in the training dataset, at each extraction layer: feature maps are created and grouped by k unique data labels to construct a set of k class-conditional distributions. For each data element in the datasets: distance sets between each feature map of each extraction layer and the extraction layer's class-conditional distributions are calculated and reduced to distance summary metrics. A drift test statistic for each extraction layer is computed between the datasets by comparing the extraction layer's distance summary metric distributions of the test dataset to distance summary metric distributions of the training dataset. The measure of drift between the datasets is computed by combining the test statistics of the extraction layers through a mathematical transform.

22 Claims, 8 Drawing Sheets

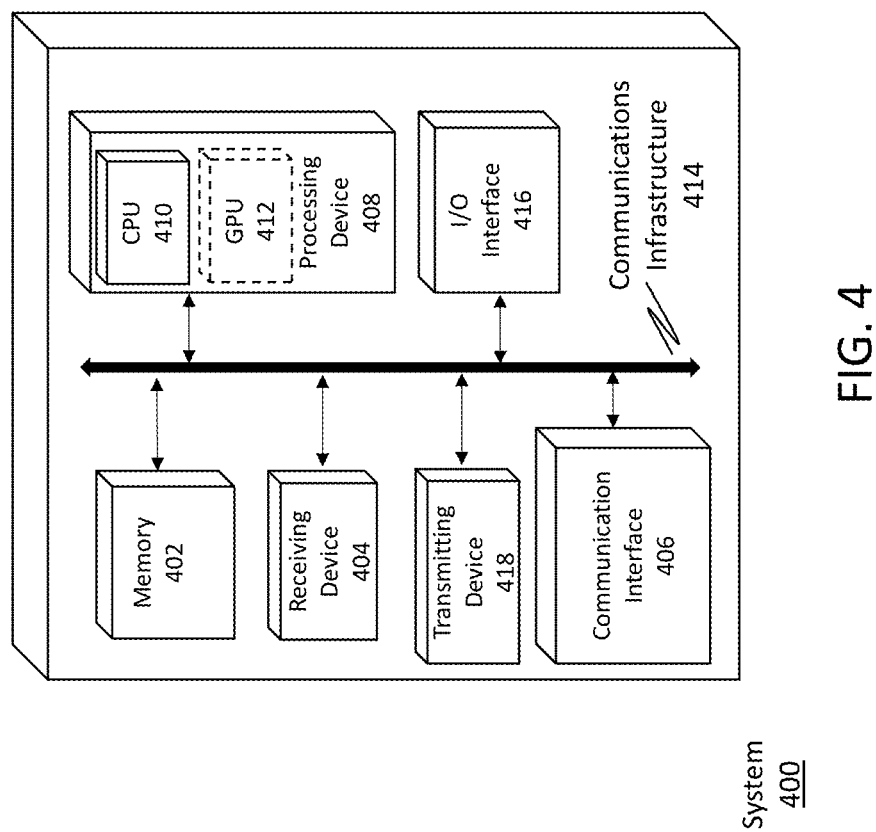

SYSTEM AND METHOD FOR DATA DRIFT DETECTION

FIELD

The present disclosure relates to the detection of data drift in a machine-learning model.

BACKGROUND

A machine learning model's performance in processing data according to how it is trained can degrade for various reasons. In general, degradation happens when a model processes data that is different from the training dataset. When a model is being trained, it learns the features that are most pertinent to the training dataset. However, learned features are unique to a specified training dataset, such that small differences between the training dataset and a test dataset (which for purposes of this disclosure can be a dataset used to test the trustworthiness of a model's outputs or a dataset input in operational or mission circumstances) could cause the model to perform poorly.

For example, suppose a model is trained to classify the subject of an image as a cat or a dog at ground level. During training, the model learns the important features to look for that differentiate cats from dogs. The important features can describe, for example, paws, snouts, eyes, or other suitable features where applicable. If a test dataset including overhead images of cats and dogs is fed into the model for inference, the paws, snouts, eyes, and other important features will no longer be visible or certain aspects of the important features may not be visible as provided in the training images taken at ground level. Even though the images of the test dataset include the same classes of subjects (e.g., cats and dogs) as the training dataset, the model will exhibit poor recognition or interpretation of the images. This result occurs because the images of the test dataset include one or more attributes (e.g., overhead perspective or view), which were not included in the training dataset. Differences between the attributes of the test data and the data used to train a machine learning model constitute "drift." Additionally, any undesirable perturbations to an output of the model resulting from those differences is said to occur as a result of "data drift." The more data drift, the less trustworthy the model results will be for that test input data. The ability to verify that a user's data has drifted very little from the training dataset allows the user to trust the model's predictions.

Detecting drift is no easy task, particularly for computer vision models. Aside from manually verifying that a model's predictions match the ground truth labels of the inputs, there do not currently exist good methods of automatically detecting drift (that is, without having the labels of the test set). Current drift detection methods focus on the difference in a model's outputs resulting from input of training and test datasets, respectively. The improvement of the present invention is that it focuses on the intra-network layer responses to the test and training datasets, respectively.

Once drift is detected, the user may want to retrain the model on their new, drifted data. This retraining will result in a model that performs more effectively on the user's new data, renewing their trust in the model's predictions.

SUMMARY

An exemplary method for detecting data drift in a machine-learning model configured with a neural network that has a plurality of intermediate layers and has been trained using a training dataset with an associated set of data labels is disclosed, the method comprising: receiving, by a receiving device of the system, the training dataset and a test dataset, each dataset having one or more data elements, and the set of data labels associated with the training dataset; for each data element included in the training dataset and the test dataset, respectively, using a processing device of the system to perform the operations of: processing the data element through the pretrained neural network; extracting features identified by a set of extraction layers comprised of a subset of layers in the plurality of intermediate layers of the neural network, wherein the features are activations of the neural network in the set of extraction layers; and generating for the data element a feature map for each extraction layer based on the extracted features; identifying all unique data labels in the set of data labels associated with the training dataset; for each extraction layer, classifying the feature maps of the training dataset by a specified data label associated with the data element; producing, for each extraction layer, a class-conditional distribution for each unique data label; for each data element included in the training dataset and the test dataset, respectively, using the processing device of the system to perform the operations of: computing, for each extraction layer, a distance set by comparing each feature map to the class-conditional distributions constructed from the training dataset; and computing a distance summary metric for each distance set; using the processing device of the system to perform the operation of generating, for each of the training dataset and test dataset, respectively, at each extraction layer, a distance summary metric distribution by aggregating the distance summary metrics for the respective dataset; and using the processing device of the system to perform the operation of determining a measure of drift between the test dataset and the training dataset by comparing the distance summary metric distributions generated for the test dataset to the distance summary metric distributions generated for the training dataset.

An exemplary system for detecting data drift in a machine-learning model is disclosed. The machine-learning model including a neural network that has a plurality of intermediate layers and has been trained using a training dataset with an associated set of data labels, the system comprising: a memory for storing program code for the model; an input device configured to receive the training dataset and a test dataset, each of the datasets having one or more data elements, and the set of data labels associated with the training dataset; and a processing device for executing the program code stored in the memory, the program code causing the processing device to: for each data element included in the training dataset and the test dataset, respectively: process the data element through the pretrained neural network; extract features identified by a set of extraction layers comprised of a subset of layers in the plurality of intermediate layers of the neural network, wherein the features are activations of the neural network in the set of extraction layers; and generate for the data element a feature map for each extraction layer based on the extracted features; identify all unique data labels in the set of data labels associated with the training dataset; for each extraction layer, classify the feature maps of the training dataset by a specified data label associated with the data element; produce for each extraction layer a class-conditional distribution for each unique data label; for each data element included in the training dataset and the test dataset, respectively, the program code causing the processing device to: compute, for each extraction layer, a distance set by comparing each feature map to the class-conditional distributions constructed from the training dataset; and compute a distance summary metric for each distance set; for the training dataset and the test dataset, respectively, generate at each extraction layer a distance summary metric distribution by aggregating the distance summary metrics for the respective dataset; and determine a measure of drift between the test dataset and the training dataset by comparing, for each extraction layer, the distance summary metric distributions generated for the test dataset to the distance summary metric distributions generated for the training dataset.

An exemplary computer readable medium is disclosed. The computer readable medium storing program code for detecting data drift in a machine-learning model, the machine-learning model including at least one neural network that has a plurality of intermediate layers and has been trained using a training dataset with an associated set of data labels, wherein when the computer readable medium is placed in communicable contact with a computer, the program code causes the computer to: receive the training dataset and a test dataset, each dataset having one or more data elements, and the set of data labels associated with the training dataset; for each data element included in the training dataset and the test dataset, respectively: process the data element through the pretrained neural network; extract features identified by a set of extraction layers comprised of a subset of layers in the plurality of intermediate layers of the neural network, wherein the features are activations of the neural network in the set of extraction layers; and generate a feature map for each extraction layer based on the extracted features; identify all unique data labels in the set of data labels associated with the training dataset; for each extraction layer, classify each feature map of the training dataset using one of the unique data labels assigned to the data element associated with each feature map; produce for each extraction layer a class-conditional distribution for each unique data label; for each data element included in the training dataset and the test dataset, respectively, the program code further causing the processing device to: compute, for each extraction layer, a distance set by comparing each feature map to the class-conditional distributions constructed from the training dataset; and compute a distance summary metric for each distance set; for each of the training dataset and the test dataset, respectively, at each extraction layer, generate a distance summary metric distribution by aggregating the distance summary metrics for the respective dataset; and determine a measure of drift between the test dataset and the training dataset by comparing, for each extraction layer, the distance summary metric distributions generated for the test dataset data to the extraction layer's distance summary metric distributions generated for the training dataset.

BRIEF DESCRIPTION OF THE DRAWINGS

Exemplary embodiments are best understood from the following detailed description when read in conjunction with the accompanying drawings. Included in the drawings are the following figures:

FIG. 4 illustrates a block diagram of a system for detecting drift according to an exemplary embodiment of the present disclosure.

Further areas of applicability of the present disclosure will become apparent from the detailed description provided hereinafter. It should be understood that the detailed description of exemplary embodiments is intended for illustration purposes only and, therefore, is not intended to necessarily limit the scope of the disclosure.

DETAILED DESCRIPTION

Figure 1A:
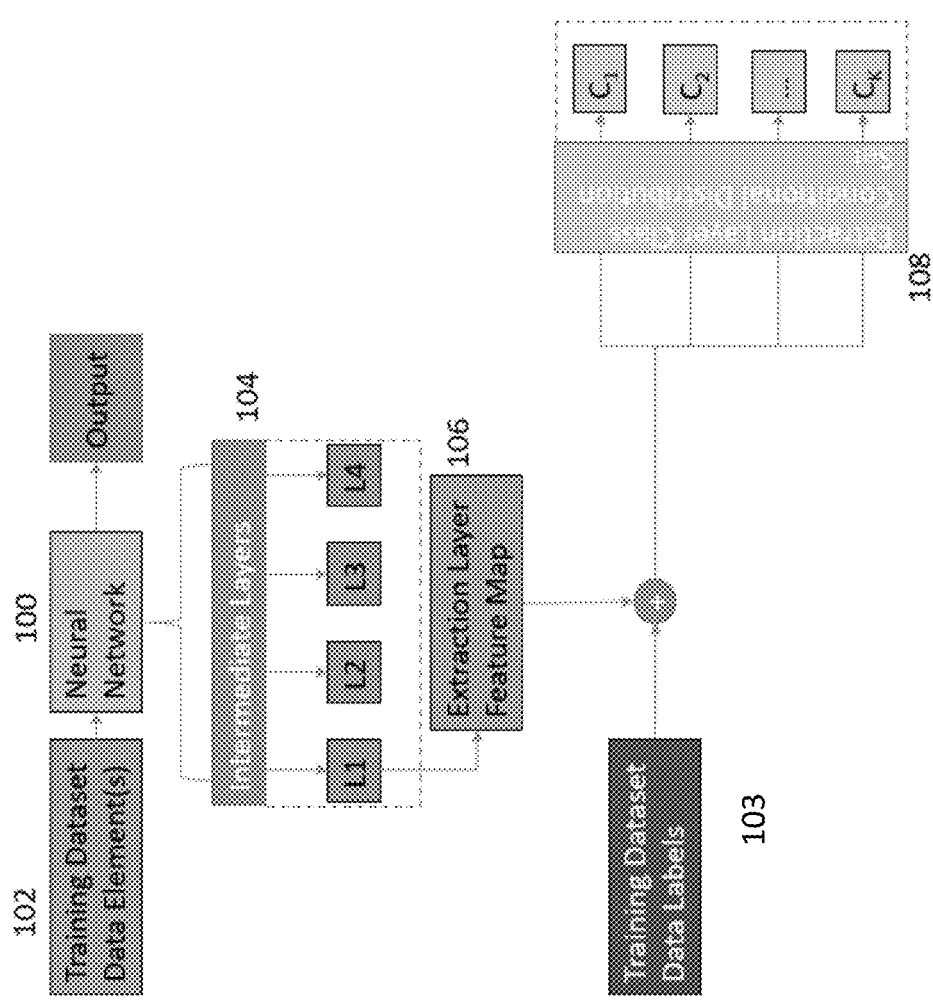
FIG. 1A illustrates a flow diagram for determining an extraction layer class-conditional distribution set in a pre-trained machine-learning model in accordance with an exemplary embodiment of the present disclosure.

FIG. 1A illustrates a flow diagram for determining an extraction layer class-conditional distribution set in a pre-trained machine-learning model in accordance with an exemplary embodiment of the present disclosure. The systems and methods for determining an extraction layer class-conditional distribution set, as described herein, can be implemented in a processing device configured with a pretrained neural network 100 having a plurality of intermediate layers 104. According to exemplary embodiments of the present disclosure, the neural network 100 can include one or more deep neural networks, such as a convolutional neural network, which is implemented according to a ResNet architecture or other suitable architecture (e.g., VGG Net, Inception Net, Bidirectional Encoder Representations from Transformers (BERT), SincNet, etc.) as desired.

Figure 1B:
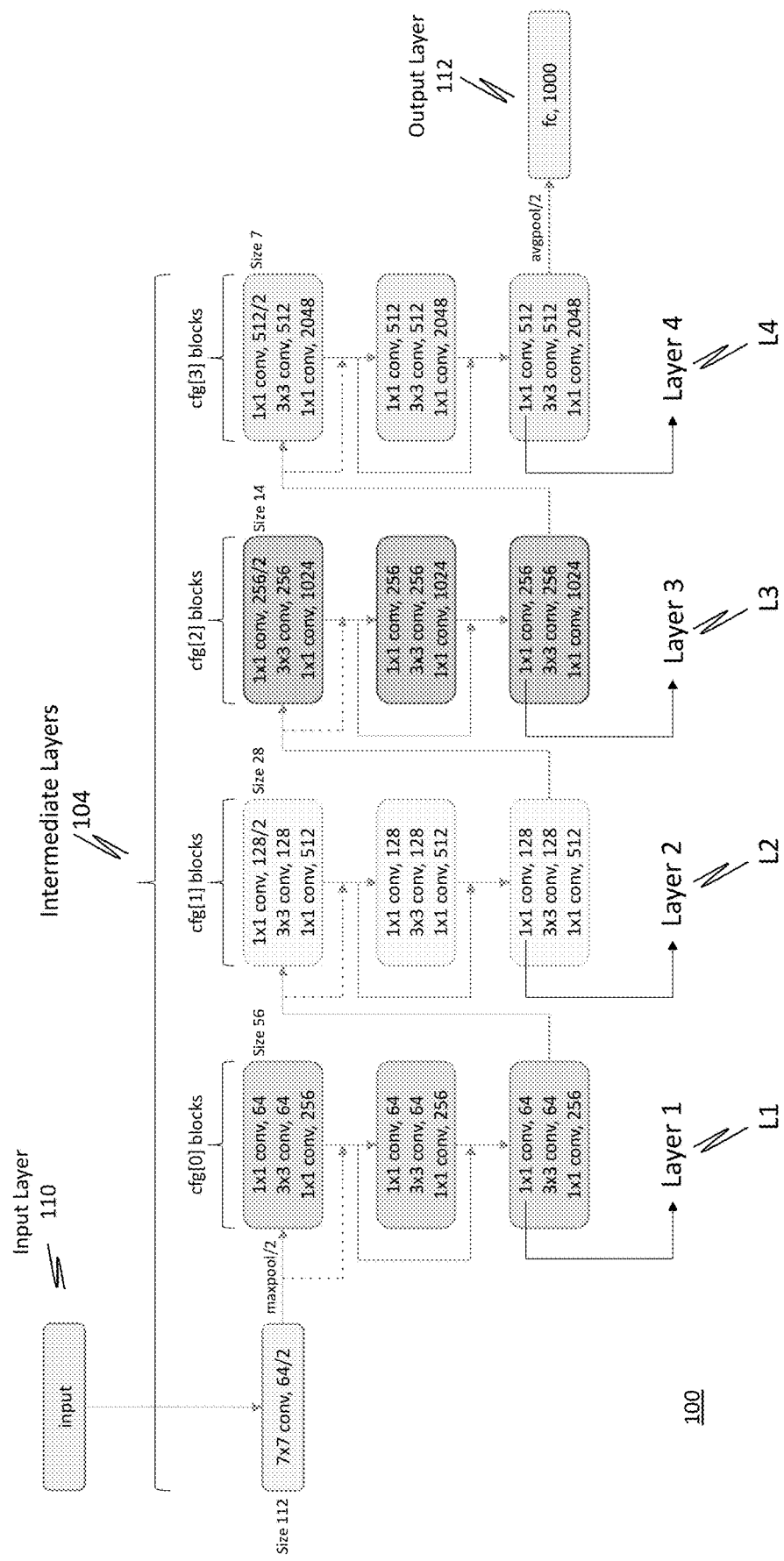
FIG. 1B illustrates a block diagram of a neural network architecture in accordance with an exemplary embodiment of the present disclosure.

FIG. 1B illustrates a block diagram of a neural network architecture 100 in accordance with an exemplary embodiment of the present disclosure. As shown in FIG. 1B, the neural network 100 can be implemented using a ResNet architecture. The layers of the neural network 100 can include an input layer 110, an output layer 112, and the plurality of intermediate layers 104. Features can be extracted at extraction layers comprising a subset (i.e., $L1, L2, \ldots, L_{final}$) of the plurality of intermediate layers 104, which can include, for example, the last 1×1 convolutional layer in each of four configuration blocks of the neural network 100. It should be understood that by "features" this disclosure refers to the activation value of the nodes of the neural network 100 in the extraction layers (i.e., $L1, L2, \ldots, L_{final}$) in the plurality of intermediate layers 104 after the processing of any data element included in the training dataset or the test dataset, respectively.

As shown in FIG. 1A, the neural network 100 can receive a training dataset (e.g., files), which includes a plurality of data elements 102 (e.g., a plurality of text objects (e.g., words, characters, phrases, documents, etc.), a plurality of audio recordings, or a plurality of visual representations (e.g., images, video, infographics, etc.)). Additionally, the network can receive a set of training dataset data labels 103 associated with the training dataset data elements 102. The neural network 100 can be pretrained for various operations associated with computer vision, natural language processing, or any other machine learning task where deep learning is appropriate. For example, according to exemplary embodiments, the neural network 100 can be pretrained for image/object/sound recognition or classification, pretrained to rate movies, pretrained to detect fraud, pretrained to recognize and/or translate text or spoken word, pretrained for sorting mail and packages, or pretrained to classify electronic mail. It should be understood that the foregoing examples, are not exhaustive, but rather representative of the various types of data processing models that can be achieved as a result of using appropriate training datasets to yield the desired accuracy for a processing objective of recognition, identification, or classification corresponding to one or more classes as they may relate to data elements 102 included in the training datasets.

A pretrained neural network 100 can process the data element(s) 102 of the received training dataset through a plurality of layers (e.g., input layer(s) 110, intermediate layers 104, and output layer(s) 112). Features can be extracted as data element(s) representations are passed through extraction layers (L1, L2, . . . , $L_{final}$) comprising a selected subset of the plurality of intermediate layers 104 of the neural network 100. The features are activations of the neural network 100 in the set of extraction layers (L1, L2, . . . , $L_{final}$). For example, a user or operator can select or set any number of the plurality of intermediate layers 104 as extraction layers (L1, L2, . . . , $L_{final}$) according to the desired performance. The number of extraction layers can affect a model's demand on compute power and processing duration, so the number of extraction layers may need to be chosen to adjust to hardware and operating characteristics of the platform on which the model is operated in the context of anticipated use case requirements. According to exemplary embodiments described herein, the neural network can be configured with four (4) extraction layers (i.e., L1, L2, L3, L4) among the plurality of intermediate layers 104.

As shown in FIG. 1A, the intermediate layers 104 of the neural network 100 can be leveraged to synthesize abstract representations of data elements 102. We refer to these abstract representations as feature maps 106. For example, assume a neural network 100 has been trained to process images of cars (i.e., data elements 102), it could be trained to classify images of cars according to a label derived from the make and model of the cars (e.g., Toyota® Camry®, Tesla® Model 3®, etc.). An extraction layer feature map 106 is generated for each data element 102 (e.g., an image of a car) included in the training dataset. FIG. 1A illustrates the extraction layer feature map 106 generated in association with extraction layer L1. However, it should be understood that an extraction layer feature map 106 is generated for each data element 102 in each extraction layer (e.g., L1, L2, L3, L4) selected among the plurality of intermediate layers 104. Each extraction layer feature map 106 is generated based on the extracted features (e.g., layer-specific, intranetwork data representations associated with a data element) of a current data element 102 input to the neural network 100 from the training data set. The extraction layer feature map 106 for each data element 102 in the training dataset is a transform (e.g., global average pooling) of the extracted features at their respective extraction layer (i.e., L1, L2, L3, L4). The feature map 106 for each extraction layer (L1, L2, L3, L4) is then saved in memory 402 along with the label (of the one or more training dataset data labels 103) associated with the data element 102 of the training dataset.

As shown in FIG. 1A, the feature map 106 for each extraction layer can be grouped in one of k distributions ($C_1$ to $C_k$). Group membership of each feature map in one of the distributions is determined according to the training data label 103 assigned to the data element 102 associated with a particular feature map 106. The resulting k groups (one group for each class represented in the training dataset) define the extraction layer class-conditional distributions ($C_1$ to $C_k$). Together the k distributions form a class-conditional distribution set 108 for an extraction layer (e.g., L1, L2, L3, L4). The set of class-conditional distributions 108 for each extraction layer (e.g., L1, L2, L3, L4) can be saved in memory 402.

Figure 1C:
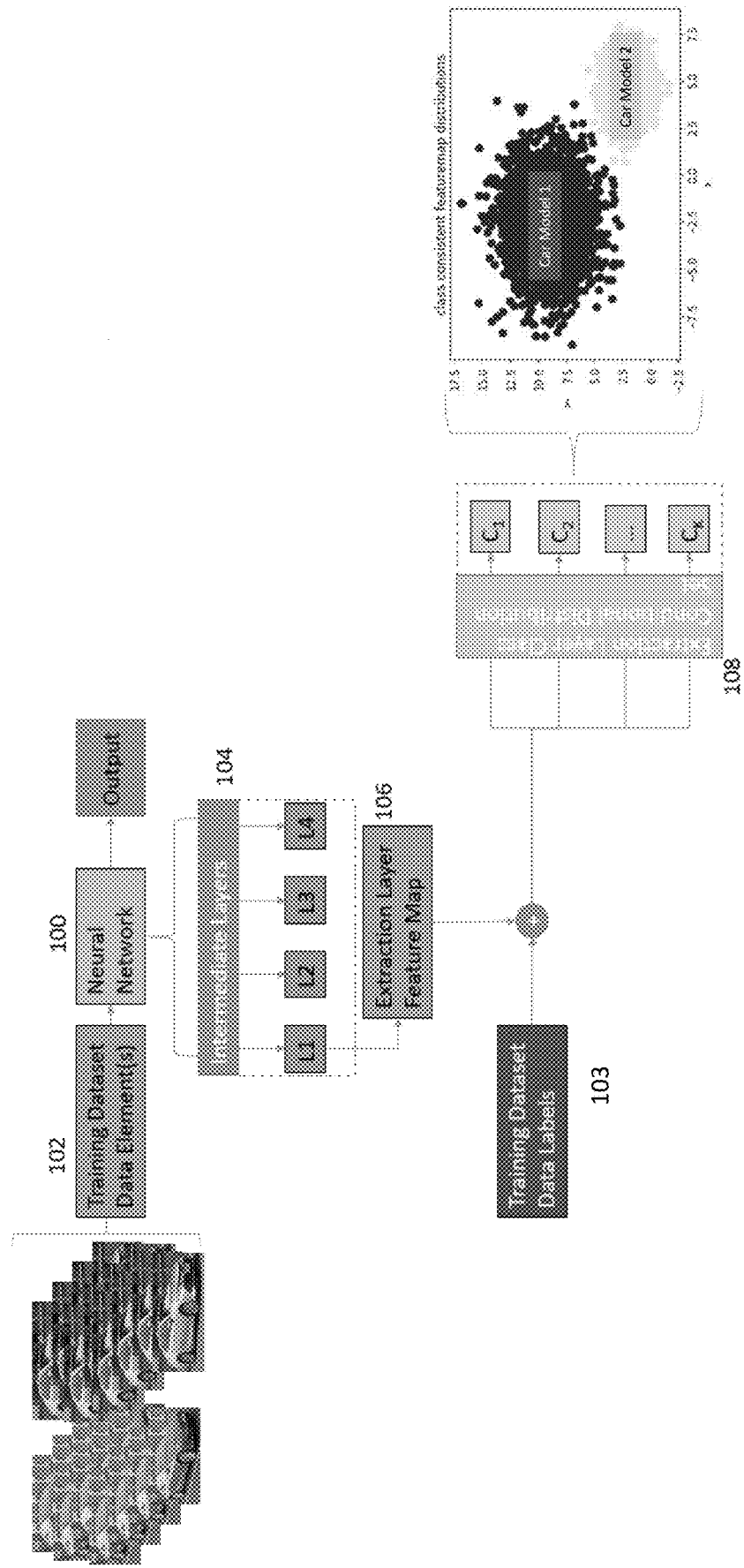
FIG. 1C illustrates an implementation of FIG. 1A for obtaining an extraction layer class-conditional distribution set from a machine learning model trained to classify images by car model using a training dataset of images of car models with associated class labels in accordance with an exemplary embodiment of the present disclosure.

FIG. 1C illustrates an implementation of the method illustrated in FIG. 1A for determining an extraction layer class-conditional distribution set where the neural network classifies images of cars by car model and the training dataset elements 102 are comprised of images of cars and associated class (i.e., car model) data labels are available for the training dataset elements 102. FIG. 1C shows a 2-class (k=2) car model dataset being converted into two two-dimensional class-consistent distributions ($C_1$ and $C_2$) comprising the conditional distribution set 108 for an extraction layer in a pretrained machine-learning model. The exemplary implementation of FIG. 1C assumes a training dataset of 10,000 images of cars from 2 classes (e.g., pictures of Toyota® Camry® or Tesla® Model 3°) with 10,000 corresponding training dataset data labels 103 (e.g., make and model of the car such as Toyota® Camry®, Tesla® Model 3®). Each data element 102 is associated with exactly one (1) training dataset data label 103. Also, the implementation in FIG. 1C assumes the ten thousand (10,000) data elements (i.e., images of cars) are evenly allocated among two (2) classes (i.e., 5000 images are assigned to the class Toyota® Camry®, and 5000 images are assigned to the class Tesla® Model 3®). The exemplary implementation of FIG. 1C assumes further that the neural network has four (4) extraction layers (L1, L2, L3, L4), resulting in a feature map for each data element being generated at each of the four extraction layers. Given these assumptions, an exemplary model of the present disclosure would produce one feature map per data element per extraction layer. Each extraction layer's feature maps are grouped or sorted into one of the k class-conditional distributions. The above assumptions would result in two class-conditional distributions (i.e., k=2) per extraction layer for a total of eight (8) class-conditional distributions across the entire neural network 100 (i.e., 2 distributions×4 extraction layers). Further, each extraction layer would have five thousand (5000) feature maps for each of the two distributions ($C_1$ and $C_2$) for a total of ten thousand (10,000) feature maps per extraction layer. Thus, for this example, the entire neural network would have forty thousand (40,000) feature maps (i.e., 4 extraction layers× 10,000 feature maps per extraction layer).

Figure 2:
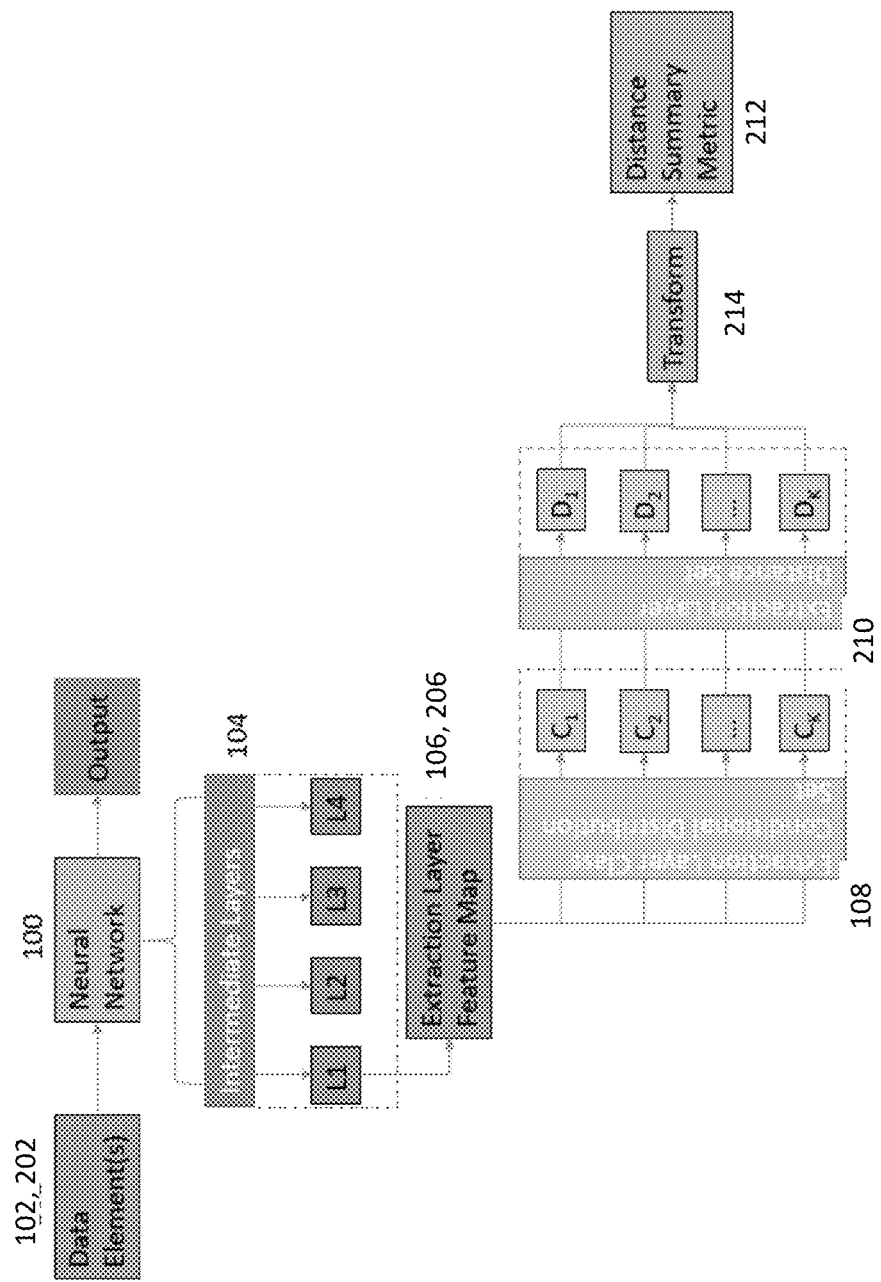
FIG. 2 illustrates a flow diagram for calculating a distance summary metric in a machine-learning model in accordance with an exemplary embodiment of the present disclosure.

Once extraction layer class distribution sets 108 are generated for each extraction layer (L1, L2, . . . , $L_{final}$) based on a training dataset, a test dataset drift summary metric 308 can be calculated. The first part of this process requires the calculation of a distance summary metric 212 for the training and test datasets, respectively, at each extraction layer. FIG. 2 illustrates a flow diagram for determining a distance summary metric 212 in a pretrained machine-learning model in accordance with an exemplary embodiment of the present disclosure. The systems and methods for determining the distance summary metric 212 in accordance with FIG. 2 can be implemented in the same processing device configured with a pretrained neural network 100 having a plurality of intermediate layers 104 as described in the context of FIGS. 1A and 1B.

As shown in FIG. 2, each data element 202 from the test dataset is fed into the neural network 100. For each data element 202 included in the test dataset, an extraction layer feature map 206 is generated for each of the extraction layers (e.g., L1, L2, L3, L4) based on extracted features. The extraction layer feature map 206 for each data element 202 is a transform (e.g., global average pooling) of the extraction layer features at each of the four extraction layers (i.e., L1, L2, L3, L4).

A distance set 210 is generated for each data element 102, 202 included in each of the training dataset or the test dataset, respectively. The distance set 210 is based on the proximity of the feature map 106, 206 associated with each data element 102, 202 (of the training dataset or test data set, respectively) to each extraction layer's k class-conditional distributions comprising the set of class-conditional distributions 108 of the training dataset. As shown in FIG. 2, the extraction layer distance set 210 is generated for each extraction layer (i.e., L1, L2, L3, L4). Each extraction layer distance set 210 for each data element 102, 202 includes a plurality of distances. For the datasets the plurality of distances (i.e., $D_1, D_2, \ldots, D_k$) in the distance set 210 for each data element 102, 202 in each extraction layer are computed by comparing each extraction layer feature map 106, 206 of each data element 102, 202 to each of the k class-conditional distributions in the extraction layer's class-conditional distribution set 108 of the training dataset by way of a specified method of calculating distance (e.g., p-Norms, Mahalanobis Distance, KL Divergence, etc.). According to exemplary embodiments of the present disclosure, the Mahalanobis Distance can be used as the method of calculating distance to calculate a plurality of k Mahalanobis Distances (i.e., $D_1, D_2, \ldots, D_k$) in the distance set 210. The distance summary metric 212 is a measure of the summarized distance between the feature map 106, 206 of the data element 102, 202 in the dataset and the class-conditional distributions (i.e., $C_1$ to $C_k$) in the extraction layer class-conditional distribution set 108.

It should be understood and readily apparent to a practitioner skilled in the art that any method of calculating distance can be used in computing the distance set 210. According to an exemplary embodiment of the present disclosure, a Mahalanobis Distance, which is a known standard measure of distance in cluster analysis applications and in anomaly detection, can be used to measure the distance between a sample and a distribution's mean while controlling for the distribution's covariance. According to exemplary embodiments of the present disclosure, the calculated distances (e.g., $D_1, D_2, \ldots, D_k$) in the distance set 210 correspond to the distance, or dissimilarity, between the extraction layer feature maps 106, 206 of a data element 102, 202 of each of the training and test datasets, respectively, and one of the k class-conditional distributions (e.g., $C_1$ to $C_k$) of the class-conditional distribution set 108 of the extraction layer (e.g., L1, L2, L3, L4). The smaller the distance between the extraction layer feature map 106, 206 of a data element 102, 202 of the training or test dataset, respectively, and an extraction layer class-conditional distribution set 108 member (e.g., $C_1$ to $C_k$) corresponding to a class, the more likely it is that the data element 102, 202 belongs to that class. A distance summary metric 212 for each data element 102, 202 can be calculated for each extraction layer (e.g., L1, L2, L3, L4) to obtain a scalar value that replaces the distances (e.g., $D_1, D_2, \ldots, D_k$) of the extraction layer distance set 110, 210 and summarizes the similarity of the extraction layer feature map 106, 206 for a data element 102, 202 within the feature space of that extraction layer (e.g., L1, L2, L3, L4) to the layer's class-conditional distributions (e.g., $C_1$ to $C_k$). The distance summary metric 212 is a metric which can be determined (e.g., calculated) according to a transform 214, which can be one of a plurality of suitable methods or algorithms.

According to an exemplary embodiment of the present disclosure, the distance summary metric 212 can be calculated by a transform 214 comprised of subtracting the smallest member of the distance set (i.e., $D_1, D_2, \ldots, D_k$) 210 from the largest member of the distance set (i.e., $D_1, D_2, \ldots, D_k$) 210. The distance summary metric 212 corresponding to a distance set (i.e., $D_1, D_2, \ldots, D_k$) 210 of a specified extraction layer in the subset of layers (e.g., L1, L2, L3, L4) of the plurality of intermediate layers 104. For example, as shown in FIG. 2, the distance summary metric 212 can be generated for the distance set 210 associated with extraction Layer 1 (i.e., L1) of the plurality of intermediate layers 104. The distance summary metric 212 for a specified distance set (i.e., $D_1, D_2, \ldots, D_k$) 210 can be generated by a transform 214 comprised of comparing each member of the distance set (i.e., $D_1, D_2, \ldots, D_k$) 210 via their placement on a standard number line, which includes numbers that increase as one moves from left to right and numbers that decrease upon moving from right to left. The comparison among the members in the distance set involves subtracting from the value of the member of the distance set with the largest value ($D_{max}$) the value of the member of the distance set with the smallest value ($D_{min}$) as follows:

$$\text{distance summary metric} = D_{max} - D_{min}$$

According to another exemplary embodiment, the distance summary metric 212 can be calculated by a transform 214 comprised of selecting the smallest (i.e., minimum) distance value (i.e., $D_{min}$) in a distance set 210. This operation can be completed by comparing each member of the distance set (i.e., $D_1, D_2, \ldots, D_k$) via their placement on the standard number line and selecting the smallest value ($D_{min}$) as the distance summary metric 212.

According to another exemplary embodiment, the distance summary metric 212 can be calculated by a transform 214 comprised of identifying (or computing, as applicable) the median value of a distance set 210.

According to yet another exemplary embodiment, the distance summary metric 212 can be calculated using a transform 214 comprised of calculating a median difference value for each distance set 210 by comparing each member of the distance set (i.e., $D_1, D_2, \ldots, D_k$) via their placement on the standard number line and identifying the value ($D_{median}$) that has an equal number of distance values preceding and succeeding it on the number line. Let $D_{o(1)}, D_{o(2)}, \ldots, D_{o(k)}$ be the ordered distance set, so that $D_{o(i)} \leq D_{o(j)}$ for all $1 \leq i < j \leq k$. In the event that the number of elements of the distance set 210 is even, $D_{median}$ can be defined as the mean of the two values $D_{o(k/2+1)}$ and $D_{o(k/2)}$.

It should be understood that the above-described distance summary metric calculation is performed for each data element in the test and training datasets, respectively. The distance summary metric calculation is performed at each extraction layer in the subset of layers (e.g., L1, L2, L3, L4) of the plurality of intermediate layers 104. Each distance summary metric 212 is determined based on at least the information provided in the feature map 106, 206 of the associated data element 102, 202.

Figure 3:
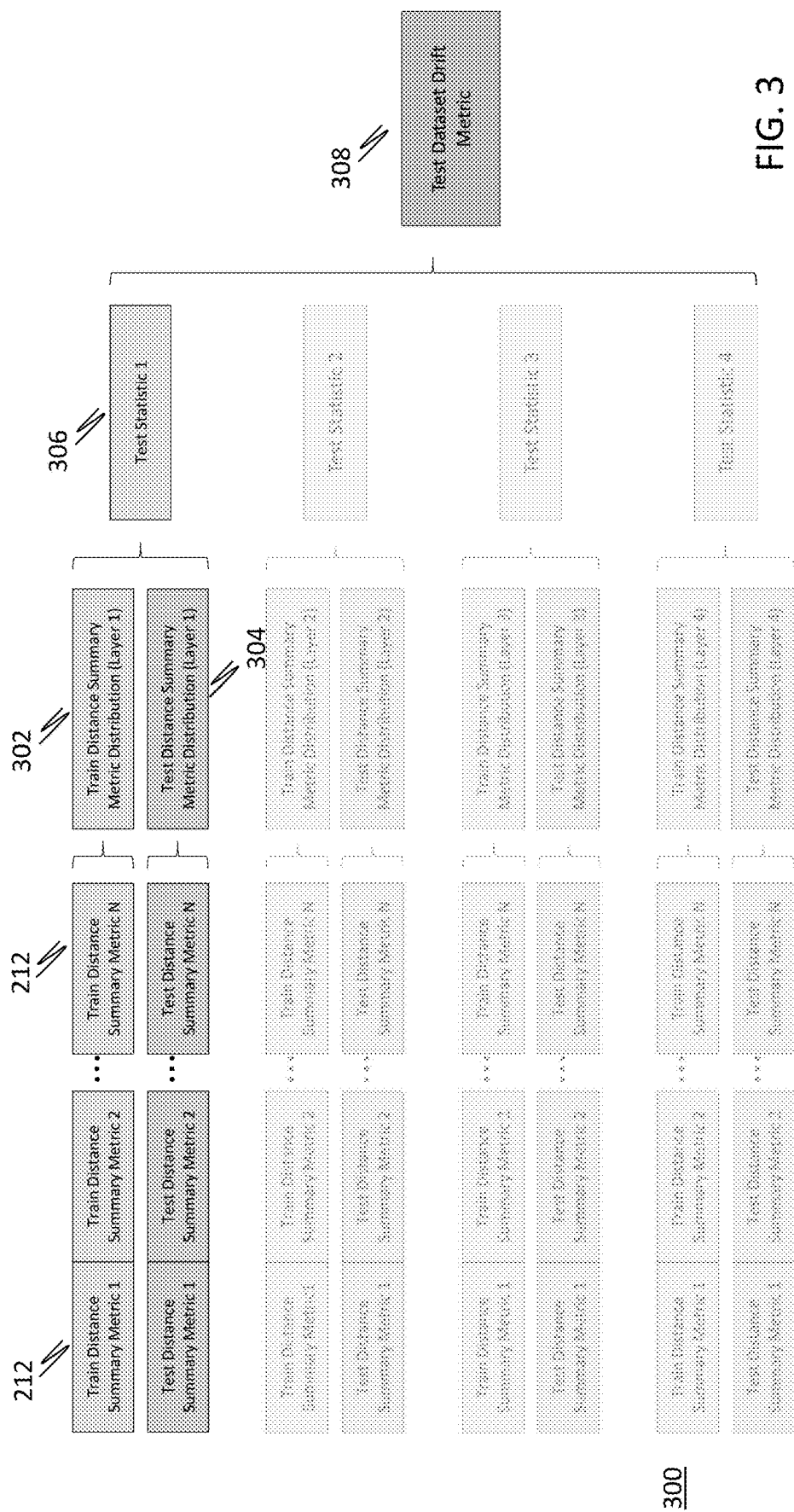
FIG. 3 illustrates a flowchart of the generation of a test dataset drift metric from a set of distance summary metric distributions in accordance with an exemplary embodiment of the present disclosure.

FIG. 3 is a flowchart 300 illustrating the generation of a test dataset drift metric 308 in accordance with an exemplary embodiment of the present disclosure. Once the distance summary metric 212 has been determined at each extraction layer (i.e., L1, L2, L3, L4) for each data element 102, 202 in the training dataset and test dataset, respectively, the distance summary metrics 212 can be grouped (e.g., aggregated) into distance summary metric distributions 302, 304, respectively, for each extraction layer. Computing the measure of data drift (i.e., the test dataset drift metric 308) includes comparing, for each extraction layer (i.e., L1, L2, L3, L4) of the plurality of intermediate layers 104, the distance summary metric distributions 302, 304 of corresponding distance summary metrics 212 associated with data elements 102, 202 of the training dataset and the test dataset, respectively. As shown in FIG. 3, for each extraction layer (i.e., L1, L2, L3, L4), the distance summary metric distributions 302, 304 generated for each of the training dataset and test dataset, respectively, are compared to generate a test statistic 306. For example, according to an exemplary embodiment, the four pairs of train/test distance distributions (L1 with L1, L2 with L2, etc.) can be compared using, for example, the Kolmogorov-Smirnov test on the distributions' respective empirical distribution functions. The resulting test statistics 306 are summarized via a transform, for example, a mean, mode, or median value which describes the measure of drift (i.e., the test dataset drift metric 308). The test dataset drift metric 308 can be output along with a human- or machine-readable label. For example, for a test dataset drift metric 308 less than 0.1, the label can designate "minor" drift; for a test dataset drift metric 308 of at least 0.1 but less than 0.2, the label can designate "low" drift; for a test dataset drift metric 308 of at least 0.2 but less than 0.3, the label can designate "moderate" drift; and for a test dataset drift metric 308 of at least 0.3, the label can designate "significant" drift.

As shown in FIG. 4, the system 400 can include memory 402, a receiving device 404, a communication interface 406, a processing device 408, a communication infrastructure 414, an input/output (I/O) interface 416, and a transmitting device 418.

The memory 402 can be configured for storing program code and data for at least one neural network having a plurality of intermediate layers 104 and trained using a training dataset. The memory 402 can include one or more memory devices such as volatile or non-volatile memory. For example, the volatile memory can include random access memory. According to exemplary embodiments, the non-volatile memory can include one or more resident hardware components such as a hard disk drive and a removable storage drive (e.g., a floppy disk drive, a magnetic tape drive, an optical disk drive, a flash memory, or any other suitable device). The non-volatile memory can include an external memory device connected to communicate with the system 400 via a network. According to an exemplary embodiment, an external memory device can be used in place of any resident memory devices. Data stored in system 400 may be stored on any type of suitable computer readable media, such as optical storage (e.g., a compact disc, digital versatile disc, Blu-ray disc, etc.) or magnetic tape storage (e.g., a hard disk drive). The stored data can include data elements, feature maps, control data, and/or system data generated and/or accessed by the processing device 408, and software or program code used by the processing device 408 for performing the tasks associated with the exemplary embodiments described herein. The data may be configured in any type of suitable database configuration, such as a relational database, a structured query language (SQL) database, a distributed database, an object database, etc. Suitable configurations and storage types will be apparent to persons having skill in the relevant art.

The receiving device 404 may be a combination of hardware and software components configured to receive the training dataset, training labels, and a test dataset. According to exemplary embodiments, the receiving device 404 can include a hardware component such as an antenna, a network interface (e.g., an Ethernet card), a communications port, a PCMCIA slot and card, or any other suitable component or device as desired. The receiving device 404 can be an input device for receiving signals and/or data packets encoded with image data from another device, such as a database, image sensor, image processor or other suitable device as desired. The receiving device 404 can be connected to other devices via a wired or wireless network or via a wired or wireless direct link or peer-to-peer connection without an intermediate device or access point. The hardware and software components of the receiving device 404 can be configured to receive data according to one or more communication protocols and data formats. For example, the receiving device 404 can be configured to communicate over a network, which may include a local area network (LAN), a wide area network (WAN), a wireless network (e.g., Wi-Fi), a mobile communication network, a satellite network, the Internet, fiber optic cable, coaxial cable, infrared, radio frequency (RF), another suitable communication medium as desired, or any combination thereof. During a receive operation, the receiving device 404 can be configured to identify parts of the received data via a header and parse the data signal and/or data packet into small frames (e.g., bytes, words) or segments for further processing at the processing device 408.

The processing device 408 can be configured for executing the program code stored in memory 402. Upon execution, the program code causes the processing device 408 to implement a machine-learning model in the form of a deep learning neural network having a plurality of intermediate layers. The processing device 408 can receive the training and/or test datasets as well as the training labels 103 from the receiving device 404 over the communications infrastructure 414 and process each data element 102, 202. The processing device 408 can extract, for each data element 102, 202 in the training dataset and the test dataset, respectively, features identified by a set of extraction layers (e.g., L1, L2, L3, L4) comprised of a subset of layers in the plurality of intermediate layers 104 of the neural network 100. The features are activations of the neural network 100 in the set of extraction layers (e.g., L1, L2, L3, L4). The processing device 408 also generates, for each of the data elements 102, 202 in the training dataset and the test dataset, respectively, a feature map 106, 206 for each extraction layer (i.e., L1, L2, L3, L4) based on the extracted features. Further, using solely the training dataset the processing device 408 groups by the data labels of the training dataset, feature maps 106 of each extraction layer (i.e., L1, L2, L3, L4) and constructs, for each unique data label in the plurality of data labels of the training dataset, a set of class-conditional distributions for each extraction layer.

By virtue of the program code, the processing device 408 can be further configured to compute, for the training dataset and the test dataset, respectively, a distance set 210 for each extraction layer by comparing each feature map 106, 206 of the training dataset and the test dataset to each class-conditional distribution in the class conditional distribution set 108 to calculate respective distance sets 210 for the training dataset and the test dataset. After the computing of the one or more distance sets 210, the processing device can calculate a distance summary metric 212 for each distance set 210. The aggregation of distance summary metrics 212 from the training or test data elements 102, 202 become the distance summary metric distributions 302 and 304, respectively, for each extraction layer. The measure of test dataset drift 308 between the test dataset and the training dataset can be computed by comparing the distribution of distance summary metrics 304 for the test dataset data elements 202 to the distribution of distance summary metrics 302 for the training dataset data elements 102. The processing device 408 can evaluate the measure of data drift (i.e., the test dataset drift metric 308) and assign a human- or machine-readable label to the measure of drift.

The processing device 408 can be a special purpose or a general purpose processing device encoded with program code or software for performing the exemplary functions and/or features disclosed herein. According to exemplary embodiments of the present disclosure, the processing device can include a central processing unit (CPU) 410 and/or a graphics processing unit (GPU) 412. The CPU 410 can be connected to the communications infrastructure 414 including a bus, message queue, or network, multi-core message-passing scheme, for communicating with other components of the system 400, such as the memory 402, input device 404, the communications interface 406, and the I/O interface 416. The CPU 410 can include one or more processing devices such as a microprocessor, microcomputer, programmable logic unit or any other suitable hardware processing devices as desired. According to exemplary embodiments, the GPU 412 can include a combination of hardware and software components, such as a special purpose hardware processing device being configured to execute or access program code or software for rendering images in a frame buffer for display. For example, the GPU 412 can include an arithmetic logic unit, on-chip memory, and be configured with an application program interface such as Vulkan®, OpenGL ES (Open Graphics Library for Embedded Systems), OpenVG (OpenVector Graphics), OpenCL (Open Computing Language), OpenGL (Open Graphics Library), Direct3D, CUDA® or any other suitable hardware and/or software platform as desired.

The I/O interface 416 can be configured to receive the signal from the processing device 408 and generate an output suitable for a peripheral device via a direct wired or wireless link. The I/O interface 416 can include a combination of hardware and software for example, a processor, circuit card, or any other suitable hardware device encoded with program code, software, and/or firmware for communicating with a peripheral device such as a display device, printer, audio output device, or other suitable electronic device or output type as desired.

The transmitting device 418 can be configured to receive data from the processing device 408 and assemble the data into a data signal and/or data packets according to the specified communication protocol and data format of a peripheral device or remote device to which the data is to be sent. The transmitting device 418 can include any one or more of hardware and software components for generating and communicating the data signal over the communications interface 414 and/or via a direct wired or wireless link to a peripheral or remote device. The transmitting device 418 can be configured to transmit information according to one or more communication protocols and data formats as discussed in connection with the receiving device 404.

Figure 5A:
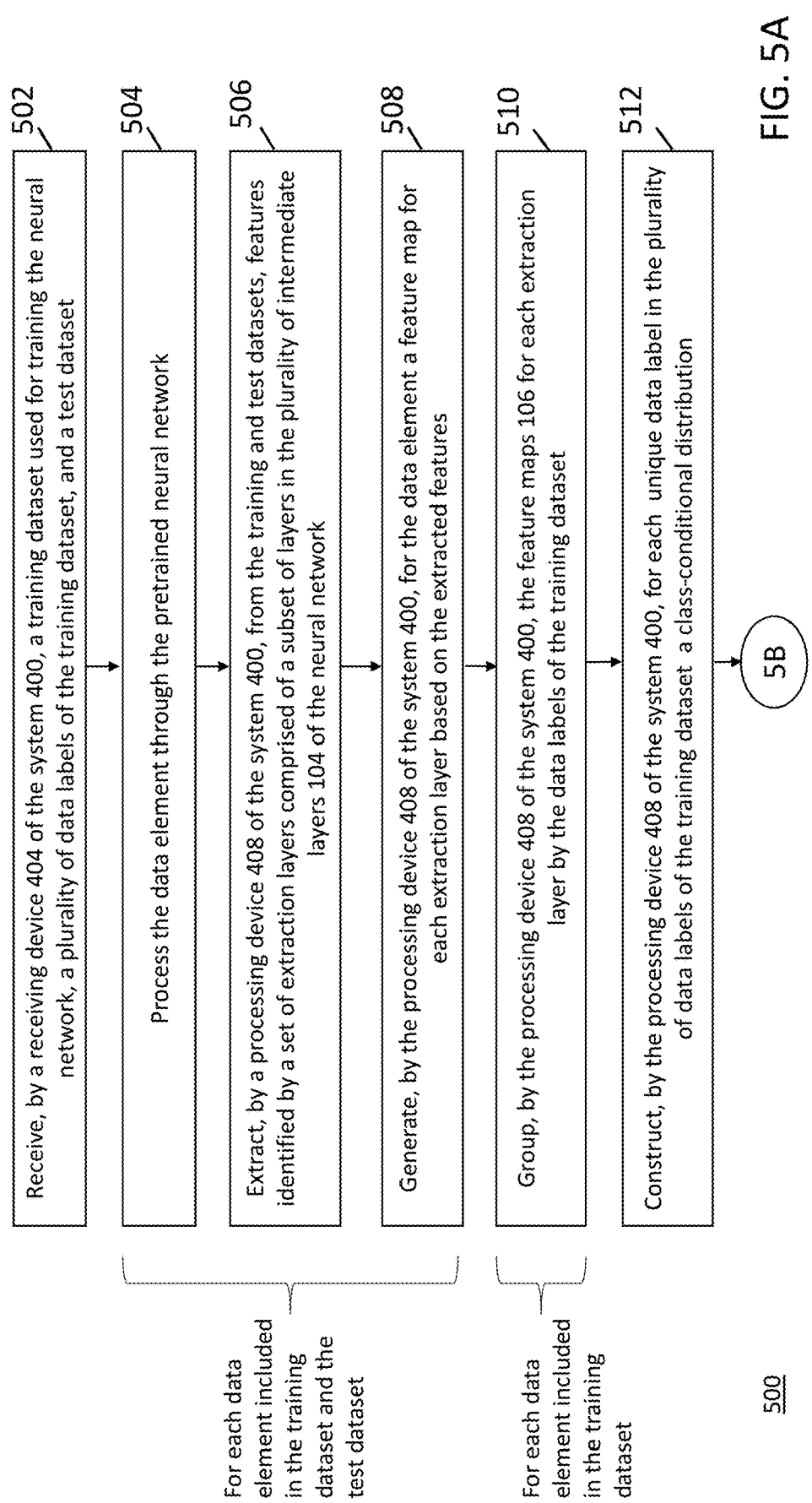
FIGS. 5A and 5B illustrate a method for detecting drift in a machine-learning model in accordance with an exemplary embodiment of the present disclosure.
Figure 5B:
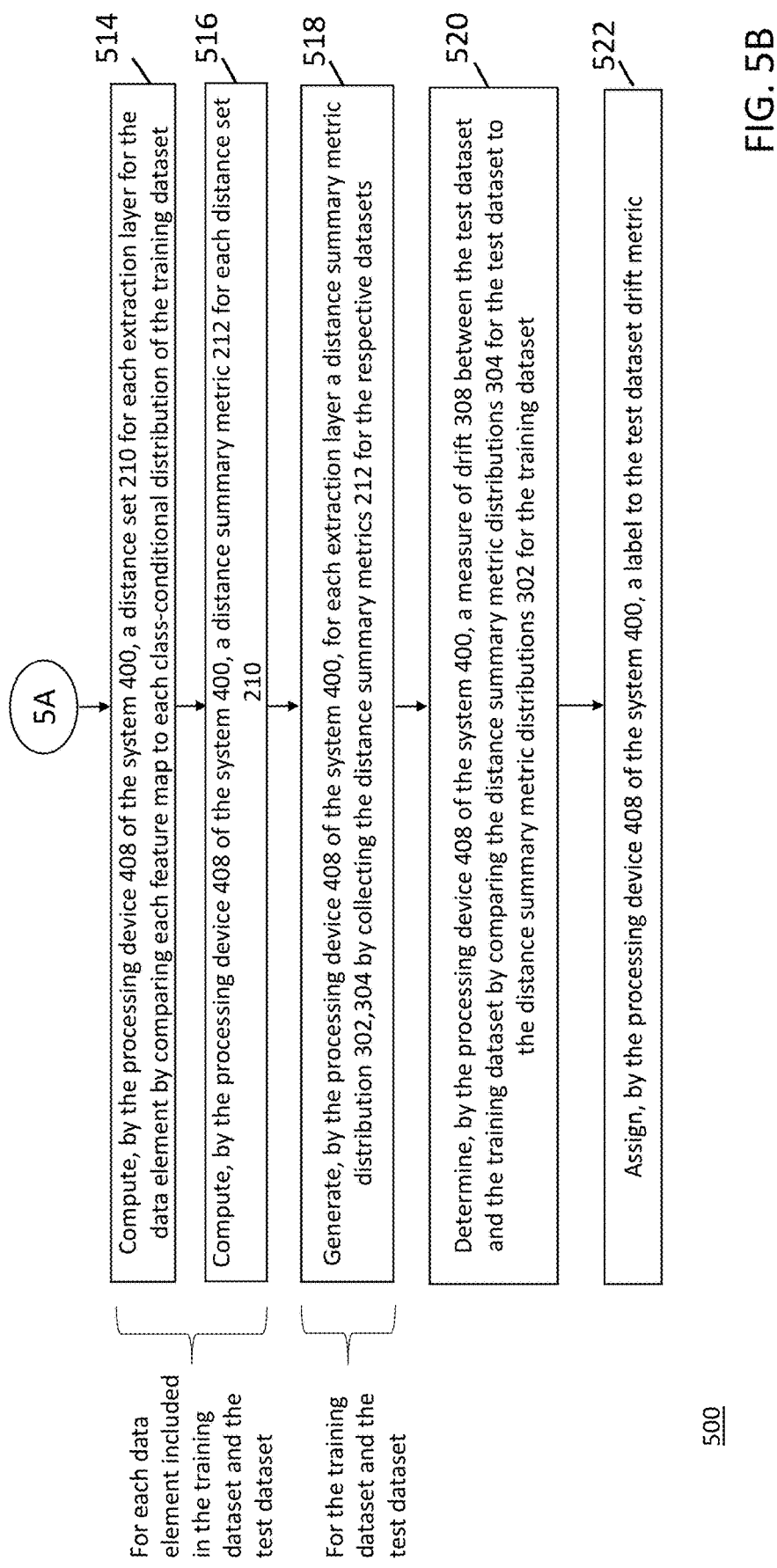

FIGS. 5A and 5B illustrate a method for detecting drift in a machine-learning model in accordance with an exemplary embodiment of the present disclosure. The method is executed in the processing device 408 configured with a pretrained neural network having a plurality of intermediate layers 104. In a step 502, the receiving device 404 receives a training dataset used to train the neural network, a plurality of data labels for the training dataset, and a test dataset. Each of the test dataset and the training dataset has one or more data elements. For each data element 102, 202 included in the training dataset and the test dataset, respectively, the processing device 408 processes the data element through the neural network (step 504), extracts features identified by a set of extraction layers (e.g., L1, L2, L3, L4) comprised of a subset of layers in the plurality of intermediate layers 104 of the neural network (step 506), and generates, for the data element, a feature map 106, 206 for each extraction layer (i.e., L1, L2, L3, L4) based on the extracted features (step 508). The processing device 408 identifies all unique data labels in the set of data labels associated with the training dataset 102. For each extraction layer (i.e., L1, L2, L3, L4), each feature map 106 generated from the training dataset is grouped by the processing device 408 using the data label assigned to the data element associated with each feature map (step 510). For each extraction layer (i.e., L1, L2, L3, L4), the processing device 408 produces a class-conditional distribution for each unique data label. To produce the class-conditional distribution for each unique data label in the plurality of training labels for the training dataset, the processing device 408 groups, by the plurality of data labels of the training dataset, the feature maps 106 for each extraction layer (i.e., L1, L2, L3, L4) and constructs, for each unique label in the plurality of data labels of the training dataset, a set of class-conditional distributions 108 for each extraction layer (i.e., L1, L2, L3, L4) (step 512). The class-conditional distributions for the groups of feature maps for each extraction layer (i.e., L1, L2, L3, L4) can be saved in memory 402. According to an exemplary embodiment, the saved class-conditional distributions can be re-used such that, in a subsequent operation, the class-conditional distributions are produced by reading them from memory 402.

In step 514, the processing device 408 computes, for each of the data elements 102, 202 included in the training dataset and the test dataset, respectively, a distance set 210 for each extraction layer (i.e., L1, L2, L3, L4) by comparing each feature map 106, 206 to each class-conditional distribution 108 of the training dataset. The processing device 408 computes a distance summary metric 212 for each distance set 210 produced by each data element 102, 202 included in the training dataset and the test dataset, respectively (step 516). In step 518, the processing device 408 generates, for each extraction layer, a distance summary metric distribution 302, 304 by aggregating the distance summary metrics 212 for the respective datasets. The processing device 408 determines a measure of data drift (i.e., the test dataset drift metric 308) between the test dataset and the training dataset by comparing the distance summary metric distribution 304 of the test dataset to the distance summary metric distribution 302 of the training dataset for each extraction layer (i.e., L1, L2, L3, L4). The comparisons can be transformed such that all distance summary metric distributions impact the final measure of data drift (i.e., the test dataset drift metric 308) (Step 520). The processing device 408 can assign a human-readable label to the measure of test dataset drift 308 (Step 522).

According to an exemplary embodiment, the system 400 can be configured as a portable device, by reducing the processing and storing requirements of the system. For example, before the detector system 400 is deployed, the feature maps 106 of the training dataset are extracted and the computations for generating the class-conditional distributions 108, the distance sets 210, the distance summary metrics 212, and the distance summary metric distributions 302 for each of the extraction layers of the subset of layers (e.g., L1, L2, L3, L4) of the plurality of intermediate layers 104 can be computed only once and saved in memory. Reuse of the class-conditional distributions can reduce time and processing power required to measure drift. After the distance summary metric distributions are generated for the training data set, access to the data elements 102 (e.g., a plurality of text objects (e.g., words, characters, phrases, etc.), a plurality of audio files, or a plurality of images) of the training dataset during dataset comparison is not necessary. Because the training dataset can be in excess of a few hundred gigabytes, it not being stored or accessed at runtime conserves a significant amount of memory 402.

According to yet another exemplary embodiment, the drift detection system 400 can be configured for real-time or near real-time drift detection operations. The speed of detection is due, in part, to a reduction or elimination in the need to access data elements 102 of the training dataset, which can be attributed to the reduced computation and memory requirements achieved by using pre-stored training dataset distance summary metric distributions 302 for each layer, as already discussed. Additionally, the drift detection speed can be attributed to circumstances or implementations in which the user requests drift calculations be performed on data they feed to the system 400 for inference, when the system is configured as a classification network, for example. According to this implementation, because features are extracted while the data elements (e.g., image files, audio files, or text files) are passing through the neural network 100, the only extra time needed to calculate drift is taken up by the number of distance calculations, which is a function of the number of classes and extraction layers.

The drift detection system and method described in the present disclosure provides a holistic view of a test dataset with respect to how a trained model can interpret received test data. As the test data passes through the layers of the neural network, the neural network evaluates the test data against the patterns learned from the training dataset. The drift detector, in turn, compares the training and test datasets on multiple levels within the network to identify incongruences in identified patterns. Additionally, for detecting drift, it is more advantageous to look inside of the neural network as opposed to just considering the outputs of the network. This aspect is important because when a classifier such as a softmax layer (e.g., a common output layer for neural network based classifiers whose output is normalized to a probability distribution over predicted output classes) is being trained, the network learns to be extremely confident in making predictions for the classes it is learning. Looking at such a network's outputs provides little information regarding the input and can readily lead to misclassification (e.g. a picture of a tank feed to a network trained to differentiate cats and dogs will always say the tank is either a cat or dog). Exemplary embodiments described herein, overcomes this limitation by evaluating the way a network responds to input internally and flagging feature activations that are incongruent with training feature activations.

Use Cases

According to exemplary embodiments of the present disclosure, the described drift detection system and methods can be used in various implementations and applications. For example, in a computer vision application, a model can be trained to detect traffic signs and classify them correctly. It can then be deployed on an autonomous vehicle. If the images in the training dataset depict road signs under ideal conditions, such as ideal environmental or weather conditions, drift can be observed in a test dataset of traffic signs that are worn or damaged, taken under rainy conditions, or in a different country where the designs, symbols, and/or markings are different. Because of one or more differences, the model may misclassify a 10 mph sign as a 70 mph sign. The ability to detect drift in the incoming data stream according to the exemplary embodiments described herein, can notify or alert a user or administrator of potential operational risks or hazards and signal the need for retraining of the model for safer and more reliable operation of the autonomous vehicle or signal a need for engaging human control of the vehicle or parking the vehicle until safe operational conditions are determined to exist.

In another computer vision example, a model can be trained to classify different types of cars in ground-level imagery. The model can learn to differentiate between different body styles, wheels, car logos/emblems, window shapes, etc. If overhead images of the same cars are sent to the model for inference, the ground level features that the model learned may no longer be applicable to the overhead imagery, as these components of the car are perceived from different perspectives or even no longer visible. The drift detector of the present disclosure can be used to measure the drift and reduction in reliability of classification because of the different network activations that will occur with different image features.

In yet another computer vision example, a model can be trained to estimate an amount of area available for solar panel installation. For example, the model can be trained on aerial imagery taken over a city during clear, sunny weather conditions. If the model is then used to perform the same task in a rural area, or under foggy conditions, or in the evening, then the model would not perform as well as it would have on imagery more similar to what it was trained on. Again, the drift detector of the present disclosure can be used to measure the drift and determine the reduction in classification reliability because of the different network activations that will occur when images outside of the training distribution are passed through the network for inference.

In another example, a model can be trained to translate text from English to Russian. The model can be trained on news articles published both in English and in Russian. If the model were used to translate colloquial text messages, the translations would likely be very poor, as the type of language in text messages is generally not found in news articles. The drift detector of the present disclosure can be used to identify the inappropriate use of the model and flag for review by a user or author the model's potential lack of accuracy for text message datasets.

The foregoing use cases are representative of circumstances in which the drift detector can evaluate degradation in the trustworthiness of a machine-learning model to classify, identify, or process data with performance metrics on par with the processing of its training dataset. In each case, if minimal drift is detected for a test dataset, a user can be more confident that the model will perform well on that data than if the measure of drift is higher. On the other hand, a drift detector based on a model's output would engender less confidence if significant drift were detected. This is because a change in input distribution can change the output distribution for a well-performing model. For example, outputs from an autonomous vehicle autopilot driven in an urban area would be heavily skewed to a variety of speed limit signs in the 15 mph to 50 mph range. Drift calculations based on these outputs would seem high during highway driving when the speed limit sign detections are in the 55 mph to 75 mph range. This high drift metric might cause the user to cease using the model if the user were to rely solely on a measure of drift calculated between the outputs of the training (urban) dataset and the outputs of the test (highway) dataset, even if the autopilot is successfully classifying the rarely seen speed limit signs.

Drift Detection Experimentation

The following tables include the results of three large drift detection experiments conducted in accordance with the exemplary embodiments of the present disclosure. In these three experiments, image classification networks were trained on the Cifar10, ImageNet10, and ImageNet datasets, respectively, and tested against a multitude of other common datasets.

TABLE 1

Detecting Drift from Cifar 10

| Test Set | Block 1 | Block 2 | Block 3 | Block 4 | Measure of Drift | Drift Detected |
|---|---|---|---|---|---|---|
| Cifar10 | 0.0054 | 0.0107 | 0.0071 | 0.0094 | 0.0082 | Minor |
| Cifar100 | 0.1802 | 0.1706 | 0.1688 | 0.0704 | 0.1475 | Low |
| SVHN | 0.1543 | 0.1833 | 0.1228 | 0.2836 | 0.1860 | Low |
| STL10 | 0.3183 | 0.3801 | 0.3555 | 0.2068 | 0.3152 | Significant |
| ImageNet10 | 0.4633 | 0.7088 | 0.6432 | 0.1806 | 0.4990 | Significant |
| Logos | 0.3746 | 0.7874 | 0.7333 | 0.2860 | 0.5453 | Significant |

TABLE 2

Detecting Drift from ImageNet10

| Test Set | Block 1 | Block 2 | Block 3 | Block 4 | Measure of Drift | Drift Detected |
|---|---|---|---|---|---|---|
| ImageNet10 | 0.0265 | 0.0337 | 0.0511 | 0.0340 | 0.0344 | Minor |
| ImageNet5 | 0.1336 | 0.0949 | 0.2190 | 0.2285 | 0.1690 | Low |
| Kaggle | 0.0851 | 0.1040 | 0.0436 | 0.0319 | 0.0661 | Minor |
| Logos | 0.0879 | 0.0919 | 0.2393 | 0.2198 | 0.1598 | Low |
| Cifar10 | 0.2897 | 0.4489 | 0.5931 | 0.6444 | 0.4940 | Significant |

TABLE 3

Detecting Drift from ImageNet

| Test Set | Block 1 | Block 2 | Block 3 | Block 4 | Measure of Drift | Drift Detected |
|---|---|---|---|---|---|---|
| ImageNet10 | 0.0568 | 0.1022 | 0.1173 | 0.1248 | 0.0993 | Minor |
| ImageNet5 | 0.0568 | 0.0634 | 0.0781 | 0.0935 | 0.0729 | Minor |
| Kaggle | 0.1581 | 0.0915 | 0.0911 | 0.1079 | 0.1121 | Low |
| Logos | 0.2156 | 0.1541 | 0.3128 | 0.3168 | 0.2498 | Moderate |
| STL10 | 0.2659 | 0.0784 | 0.2031 | 0.2805 | 0.2070 | Moderate |
| Cifar10 | 0.8200 | 0.9618 | 0.6740 | 0.8907 | 0.8366 | Significant |
| SVHN | 0.9353 | 0.9788 | 0.8829 | 0.9712 | 0.9420 | Significant |

Cifar10 is a dataset consisting of 32×32 pixel images split into 10 classes including, for example, airplane, automobile, bird, cat, deer, dog, frog, horse, ship, and truck.

Cifar100 consists of 32×32 pixel images split into 100 classes. None of the Cifar10 classes is exactly replicated in Cifar100 by name, though the Cifar100 dataset includes multiple types of vehicles, dogs, and cats.

ImageNet is a very large dataset consisting of 1,000 classes and the average resolution of the images is 430×490.

ImageNet10 is a subset of the ImageNet dataset and contains eight of the same 10 classes as Cifar10 (e.g., airplane, automobile, beetle, bird, cat, dog, frog, ship, truck, vegetable). The ImageNet10 dataset has a mean resolution of 411×496.

The ImageNet5 dataset consists of 5 classes from the ImageNet dataset. It shares two (2) (e.g., bird and car) of its 5 classes (e.g., ball, bird, car, fruit, primate) with ImageNet10's classes. The actual images in the bird classes of both ImageNet10 and ImageNet5 do not match. The mean resolution of the ImageNet5 dataset is 404×490.

Kaggle is Kaggle's Dogs vs. Cats dataset, consisting of images of cats and dogs used for an image classification competition. It has a mean resolution is 360×404.

Logos is a subset of the Logos in the Wild dataset. It has a mean resolution of 671×928. Many of the images in the Logos dataset contain objects, such as cars and planes, which are similar to corresponding objects in the ImageNet dataset.

The STL10 dataset contains the same 10 classes as Cifar10, but its images are all at a resolution of 96×96 pixels.

SVHN is a dataset whose images capture street-view house number. It includes 10 classes, which correspond to the digits 0 through 9. The SVHN dataset has images at a resolution of 32×32 pixels.

The computer program code for performing the specialized functions described herein can be stored on a non-transitory computer usable medium, such as the memory devices for the system 400 (e.g., computing device), which may be memory semiconductors (e.g., DRAMs, etc.) or other tangible non-transitory means for providing software to the system 400. The computer programs (e.g., computer control logic) or software may be stored in a memory device 402 resident on/in the system 400 (e.g., a computing device). The computer programs may also be received via a communications interface. Such computer programs, when executed, may enable the system 400 to implement the present methods and exemplary embodiments discussed herein. Accordingly, such computer programs may represent controllers of the system 400. Where the present disclosure is implemented using software, the software may be stored in a computer program product or non-transitory computer readable medium and loaded into the system 400 using a removable storage drive, an interface, a hard disk drive, or communications interface 406, where applicable.

The processing device 408 can include one or more modules or engines configured to perform the functions of the exemplary embodiments described herein. Each of the modules or engines may be implemented using hardware and, in some instances, may also utilize software, such as corresponding to program code and/or programs stored in memory 402. In such instances, program code may be interpreted or compiled by the respective processors (e.g., by a compiling module or engine) prior to execution. For example, the program code may be source code written in a programming language that is translated into a lower level language, such as assembly language or machine code, for execution by the one or more processors and/or any additional hardware components. The process of compiling may include the use of lexical analysis, preprocessing, parsing, semantic analysis, syntax-directed translation, code generation, code optimization, and any other techniques that may be suitable for translation of program code into a lower level language suitable for controlling the system 400 to perform the functions disclosed herein. It will be apparent to persons having skill in the relevant art that such processes result in the system 400 being a specially configured computing device uniquely programmed to perform the functions of the exemplary embodiments described herein.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A method for detecting data drift in a machine-learning model in a system configured with a neural network having a plurality of intermediate layers, wherein the neural network has been trained using a training dataset with an associated set of data labels, the method comprising:

receiving, by a receiving device of the system, the training dataset and a test dataset, each dataset having one or more data elements, and the set of data labels associated with the training dataset;

by a processing device of the system:

for each data element included in the training dataset and the test dataset, respectively:

processing the data element through the pretrained neural network;

extracting features identified by a set of extraction layers comprised of a subset of layers in the plurality of intermediate layers of the neural network, wherein the features are activations of the neural network in the set of extraction layers; and generating for the data element a feature map for each extraction layer based on the extracted features;

for each extraction layer, classifying each feature map derived from a data element in the training dataset by assigning the feature map the same data label, from the set of data labels, associated with the data element;

identifying all unique data labels in the set of data labels associated with the training dataset;

for each extraction layer:

producing a class-conditional distribution of the extraction layer's feature maps of the training dataset for each unique data label;

producing a distance summary metric for each data element included in the training dataset and the test dataset, respectively, by:

computing a distance set by comparing the data element's feature map to the extraction layer's class-conditional distributions constructed from the training dataset; and computing the distance summary metric for each distance set;

generating, for each of the training dataset and test dataset, respectively, a distance summary metric distribution by aggregating the extraction layer's distance summary metrics for the respective dataset; and determining a measure of drift between the test dataset and the training dataset by comparing the distance summary metric distributions generated for the test dataset to the distance summary metric distributions generated for the training dataset.

2. The method of claim 1, wherein producing a class-conditional distribution for each unique data label comprises:
grouping the feature maps for each extraction layer such that feature maps with the same data label are in the same group;
constructing for each unique data label a class-conditional distribution of the group of feature maps; and
saving the class-condition distribution of the group of feature maps in memory.

3. The method of claim 1, wherein producing a class-conditional distribution for each unique data label comprises:
reading from memory, the class-conditional distributions generated for each extraction layer.

4. The method of claim 1, comprising:
for the training dataset, computing metrics that characterize a set of class-conditional distributions for each extraction layer based on the grouping of feature maps into respective classes at the extraction layer; and
for each data element of the training dataset and test dataset, respectively, using a method of computing distance to compute the distance set for the data element at the extraction layer.

5. The method of claim 4, wherein the method of computing distance produces the distance set by comparing, for a respective data element, the feature map for the extraction layer to the extraction layer's set of class-conditional distributions constructed from the training dataset.

6. The method of claim 4, wherein the method of computing distance is one of p-Norms, Mahalanobis Distance, or KL Divergence.

7. The method of claim 1, wherein computing a distance summary metric for each distance set comprises:
comparing each member of the distance set to identify a largest value and a smallest value of the distance set;
subtracting the smallest value from the largest value to obtain a difference; and
setting the distance summary metric to be the difference.

8. The method of claim 1, wherein computing a distance summary metric for each distance set comprises:
comparing each member of the distance set to identify a smallest value of the distance set; and
setting the distance summary metric to be the smallest value.

9. The method of claim 1, wherein computing a distance summary metric for each distance set comprises:
calculating the median of the distance set; and
setting the distance summary metric to be the median.

10. The method of claim 1, wherein the data elements are one of a text object, audio recording, image, or binary file.

11. The method of claim 1, comprising:
assigning a label to the measure of drift between the test dataset and the training dataset.

12. A system for detecting data drift in a machine-learning model including a neural network that has a plurality of intermediate layers and has been trained using a training dataset with an associated set of data labels, the system comprising:

a memory for storing program code for the model;
an input device configured to receive the training dataset and a test dataset, each of the datasets having one or more data elements, and the set of data labels associated with the training dataset; and
a processor for executing the program code stored in the memory, the program code causing the processing device to:
for each data element included in the training dataset and the test dataset, respectively:
process the data element through the pretrained neural network;
extract features identified by a set of extraction layers comprised of a subset of layers in the plurality of intermediate layers of the neural network, wherein the features are activations of the neural network in the set of extraction layers; and
generate for the data element a feature map for each extraction layer based on the extracted features;
for each extraction layer, classify each feature map derived from a data element in the training dataset by assigning the feature map the same data label, from the set of data labels, associated with the data element;
identify all unique data labels in the set of data labels associated with the training dataset;
for each extraction layer:
produce a class-conditional distribution of the extraction layer's feature maps of the training dataset for each unique data label;
produce a distance summary metric for each data element included in the training dataset and the test dataset, respectively, the program code causing the processing device to:
compute a distance set by comparing the data element's feature map to the extraction layer's class-conditional distributions constructed from the training dataset; and
compute the distance summary metric for each distance set;
generate, for the training dataset and the test dataset, respectively, a distance summary metric distribution by aggregating the extraction layer's distance summary metrics for the respective dataset; and
determine a measure of drift between the test dataset and the training dataset by comparing, for each extraction layer, the distance summary metric distributions generated for the test dataset to the distance summary metric distributions generated for the training dataset.

13. The system of claim 12, wherein, to produce a class-conditional distribution for each unique data label, the program code further causes the processor to:
group the feature maps for each extraction layer such that feature maps with the same data label are in the same group;
construct for each unique data label a class-conditional distribution of the group of feature maps; and
save the class-condition distribution of the group of feature maps in memory.

14. The system of claim 12, wherein, to produce a class-conditional distribution for each unique data label, the program code further causes the processor to:
read, from memory, the class-conditional distributions generated for each extraction layer.

15. The system of claim 12, wherein the program code further causes processor to:
for the training dataset, compute metrics that characterize a set of class-conditional distributions based on the grouping of feature maps for the data elements of the training dataset into respective classes at each extraction layer; and for each data element of the training dataset and test dataset, respectively, use a method of computing distance to compute the distance set for the data element at each extraction layer.

16. The system of claim 12, wherein to compute the distance set for each extraction layer, the program code further causes the processor to compare each feature map of a respective data element to the extraction layer's set of class-conditional distributions constructed from the training dataset.

17. The system of claim 16, wherein the program code further causes the processor to compute the distance set using one of p-Norms, Mahalanobis Distance, or KL Divergence.

18. The system of claim 12, wherein, to compute a distance summary metric for each distance set, the program code further causes the processor to:

compare each member of the distance set to identify a largest value and a smallest value of the distance set;

subtract the smallest value from the largest value to obtain a difference; and set the distance summary metric to be the difference.

19. The system of claim 12, wherein, to compute a distance summary metric for each distance set, the program code further causes the processor to:

compare each member of the distance set to identify a smallest value of the distance set; and set the distance summary metric to be the smallest value.

20. The system of claim 12, wherein, to compute a distance summary metric for each distance, the program code further causes the processor to:

calculate a median of the distance set; and set the distance summary metric to the median.

21. The system of claim 12, wherein the program code further causes the processor to assign a label to the measure of drift between the test dataset and the training dataset.

22. A non-transitory computer readable medium storing program code for detecting data drift in a machine-learning model, the machine-learning model including at least one neural network that has a plurality of intermediate layers and has been trained using a training dataset with an associated set of data labels, wherein when the computer readable medium is placed in communicable contact with a computer, the program code causes the computer to:

receive the training dataset and a test dataset, each dataset having one or more data elements, and the set of data labels associated with the training dataset;

for each data element included in the training dataset and the test dataset, respectively:

process the data element through the pretrained neural network;

extract features identified by a set of extraction layers comprised of a subset of layers in the plurality of intermediate layers of the neural network, wherein the features are activations of the neural network in the set of extraction layers; and generate a feature map for each extraction layer based on the extracted features;

for each extraction layer, classify each feature map derived from a data element in the training dataset by assigning the feature map the same data label, from the set of data labels, associated with the data element;

identify all unique data labels in the set of data labels associated with the training dataset;

for each extraction layer:

produce a class-conditional distribution of the extraction layer's feature maps of the training dataset for each unique data label;

produce a distance summary metric for each data element included in the training dataset and the test dataset, respectively, the program code further causing the processing device to:

compute a distance set by comparing the data element's feature map to the extraction layer's class-conditional distributions constructed from the training dataset; and compute the distance summary metric for each distance set;

generate, for each of the training dataset and the test dataset, respectively, a distance summary metric distribution by aggregating the extraction layer's distance summary metrics for the respective dataset; and determine a measure of drift between the test dataset and the training dataset by comparing, for each extraction layer, the distance summary metric distributions generated for the test dataset data to the extraction layer's distance summary metric distributions generated for the training dataset.

* * * * *